(12) United States Patent
Bijalwan et al.

(10) Patent No.: US 12,100,196 B2
(45) Date of Patent: Sep. 24, 2024

(54) METHOD AND MACHINE LEARNING SYSTEM TO PERFORM QUANTIZATION OF NEURAL NETWORK

(71) Applicant: Blaize, Inc., El Dorado Hills, CA (US)

(72) Inventors: Deepak Chandra Bijalwan, Hyderabad (IN); Pratyusha Musunuru, Hyderabad (IN)

(73) Assignee: Blaize, Inc., El Dorado Hills, CA (US)

( * ) Notice: Subject to any disclaimer, the term of this patent is extended or adjusted under 35 U.S.C. 154(b) by 382 days.

(21) Appl. No.: 17/699,255

(22) Filed: Mar. 21, 2022

(65) Prior Publication Data
US 2023/0058500 A1    Feb. 23, 2023

Related U.S. Application Data

(60) Provisional application No. 63/235,789, filed on Aug. 22, 2021.

(51) Int. Cl.
*G06V 10/82* (2022.01)
*G06V 10/44* (2022.01)
*G06V 10/776* (2022.01)

(52) U.S. Cl.
CPC .......... *G06V 10/776* (2022.01); *G06V 10/454* (2022.01)

(58) Field of Classification Search
CPC ............................. G06V 10/82; G06V 10/454
USPC .......................................... 382/156
See application file for complete search history.

(56) References Cited

U.S. PATENT DOCUMENTS

| 10,373,050 | B2 | 8/2019 | Lin et al. |
| 2021/0034982 | A1* | 2/2021 | Sather .................... G06N 3/082 |
| 2021/0218414 | A1 | 7/2021 | Malhotra et al. |

* cited by examiner

*Primary Examiner* — Jamares Q Washington

(57) ABSTRACT

The present disclosure relates to a system and method of performing quantization of a neural network having multiple layers. The method comprises receiving a floating-point dataset as input dataset and determining a first shift constant for first layer of the neural network based on the input dataset. The method also comprises performing quantization for the first layer using the determined shift constant of the first layer. The method further comprises determining a next shift constant for next layer of the neural network based on output of a layer previous to the next layer, and performing quantization for the next layer using the determined next shift constant. The method further comprises iterating the steps of determining shift constant and performing quantization for all layers of the neural network to generate fixed point dataset as output.

24 Claims, 6 Drawing Sheets

METHOD AND MACHINE LEARNING SYSTEM TO PERFORM QUANTIZATION OF NEURAL NETWORK

RELATED APPLICATIONS

This patent application claims the benefit of U.S. Provisional patent application Ser. No. 63/235,789, filed Aug. 22, 2021, which is herein incorporated by reference.

TECHNICAL FIELD

The present disclosure relates to neural networks in general and more particularly, to method and system to perform quantization of neural networks.

BACKGROUND

Deep neural networks have outperformed several existing machine learning models and have become the state-of-the-art in many fields, namely, computer vision, medical imaging, natural language processing and speech recognition, even rivalling up to human cognizance in some. The success of the deep neural networks is significantly attributed to the depth of the model, number of parameters in the model and the complexity of the model. Despite the success of these networks, the training and inference are exceptionally computation-intensive and memory-consuming, requiring lots of computational power and storage. Due to the high resource requirements, many deep learning or neural network tasks are mainly done in the cloud (most of the computations are either performed on GPUs or special hardware such as neuronal network accelerators).

Owing to the computation and power constraints, in many cases the deep learning or neural networks cannot be deployed in resource constrained settings. Therefore, it is difficult and demanding to embed these deep learning or neural networks in low resource devices for utilization in real world tasks. Thus, it is desirous to have a machine learning system and associated method that reduce the number of parameters in the neural network which would not only reduce memory consumption but also the computation time.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Embodiments of the present disclosure relate to a method of performing quantization of a neural network having multiple layers. The method comprises receiving a floating-point dataset as input dataset and determining a shift constant for each layer of the neural network based on the input dataset. The method also comprises performing quantization for each layer using the determined shift constant to generate the corresponding fixed-point dataset as output dataset. The method further comprises iterating the steps of determining shift constant and performing quantization for all layers of the neural network.

Another aspect of the present disclosure relates to a system to perform quantization of a neural network having multiple layers. The apparatus comprises a processor, wherein the processor is configured to receive floating-point dataset as input dataset and determine a shift constant for each layer of the neural network based on the input dataset. The processor is also configured to perform quantization for each layer using the determined shift constant to generate the corresponding fixed-point dataset as output dataset and iterate the steps: determination of shift constant and performance of quantization for all layers of the neural network.

Yet another aspect of the present disclosure relates to a non-transitory computer readable medium comprising instructions that, when executed, cause one or more processors to receive floating-point dataset as input dataset and determine a shift constant for each layer of the neural network based on the input dataset. The one or more processors is configured to perform quantization for each layer using the determined shift constant to generate the corresponding fixed-point dataset as output dataset and iterate the steps: determination of shift constant and performance of quantization for all layers of the neural network.

The aforementioned aspects of the present disclosure may overcome one or more of the shortcomings of the prior art. Additional features and advantages may be realized through the techniques of the present disclosure. Other embodiments and aspects of the disclosure are described in detail herein and are considered a part of the claimed disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

DETAILED DESCRIPTION

Figure 1:
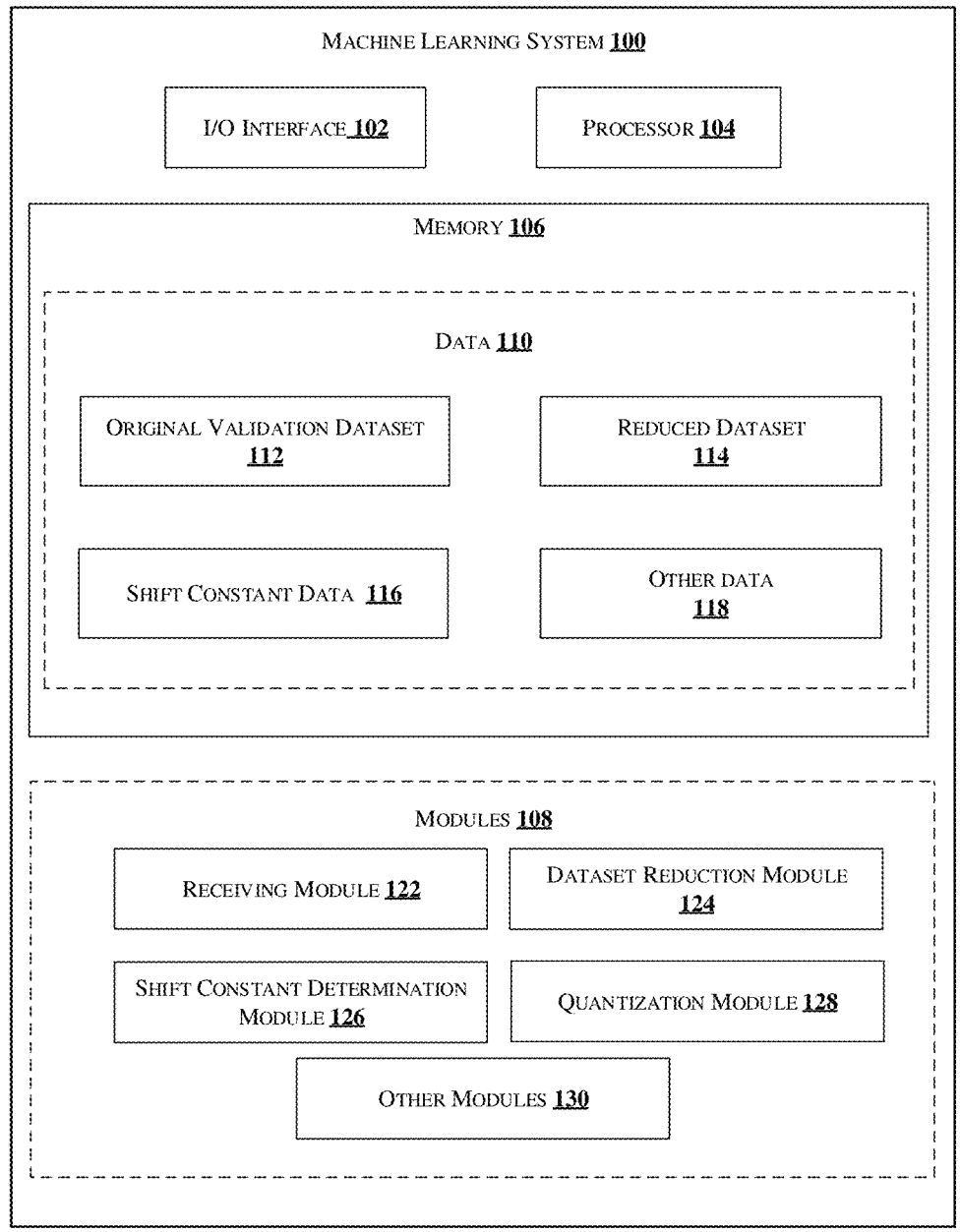
FIG. 1 illustrates an exemplary block diagram of a machine learning system to perform quantization of a neural network in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 is an exemplary block diagram of a machine learning system (MLS) 100 to perform quantization of a neural network in accordance with some embodiments of the present disclosure.

The machine learning system 100 (hereinafter referred to as system 100) is configured to perform quantization of neural network using one or more components of the system 100. In one embodiment, the system 100 quantizes a floating-point dataset associated with input of the neural network to a corresponding fixed-point dataset output with improved accuracy, wherein dataset refers to plurality of images. The system 100 computes a real value known as shift constant and propagates the shift constant across different layers of the neural network to achieve minimum accuracy loss post quantization.

In an embodiment, the MLS 100 may include an I/O interface 102, a processor 104, a memory 106, and one or more modules 108. The I/O interface 102 may be configured to receive one or more inputs such as an original validation dataset from one or more external data sources. The processor 104 may be configured to perform one or more functions of the MLS 100 for performing quantization of a neural network. The memory 106 may be communicatively coupled to the processor 106 and may store data 110 and other related data.

In some embodiments, the MLS 100 may include the modules 108 for performing various operations in accordance with embodiments of the present disclosure. In an embodiment, the modules 108 may include, without limiting to, a receiving module 122, a dataset reduction module 124, a shift constant determination module 126, and a quantization module 128. The MLS 100 may also comprise other modules 130 to perform various miscellaneous functionalities of the MLS 100. It will be appreciated that such aforementioned modules may be represented as a single module or a combination of different modules. The modules may be implemented in the form of software implemented by a processor, hardware and or firmware.

The data 110 may be stored within the memory 106 and may include, without limiting to, original validation dataset 112, reduced dataset 114, shift constant data 116, and other data 118. In some embodiments, the data 110 may be stored within the memory 106 in the form of various data structures. Additionally, the data 110 may be organized using data models, such as relational or hierarchical data models. The other data 118 may comprises other temporary data generated by other module 130 for performing various functions of the MLS 100.

The MLS 100 further comprises I/O devices (not shown) coupled with the processor 104. The I/O device is configured to receive inputs via the I/O interface 102 and transmit outputs for displaying in the I/O device via the I/O interface 102. In one embodiment, the I/O interface may include the keypad, switch, digital pen as the input devices and speaker, LEDs, LCD as the output devices.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 130 may be used to perform various miscellaneous functionalities of the MLS 100. It will be appreciated that such other modules 130 may be represented as a single module or a combination of different modules.

In operation, the system 100 performs quantization of a floating-point neural network to a fixed-point neural network using the modules 108. In one implementation, the receiving module 122 is configured to receive the original validation dataset 112 from any external data source and transmit to the dataset reduction module 124 through the I/O interface 102. In one example, the original validation dataset 112 comprises a plurality of test images or test dataset obtained from an external system.

The dataset reduction module 124 is configured to receive the original validation dataset and obtain the reduced dataset 114 for computation of parameters required for quantization of the neural network. The dataset reduction module 124 is configured to obtain the reduced dataset 114, which is subset of the original validation dataset 112 for quantization calibration, so that the reduced dataset 114 have representational images covering all combinations of dynamic ranges present in the original validation dataset 112. In order to obtain the reduced dataset 112, the dataset reduction module 124 is configured to determine true positive images from the received original validation dataset 112 in case if the original validation dataset 112 have been classified as true and false positive images by respective models. The dataset reduction module 124 considers only true positive images as test images for computation of effective vector, as false positive images will not degrade the accuracy after quantization. In one embodiment, the dataset reduction module 124 is configured to compute the effective vector for each test image, wherein the effective vector is a max_min ratio_vector which will be explained in detail in the forthcoming paragraphs.

In order to compute the effective vector of each test image, the dataset reduction module 124 is configured to compute maximum and minimum value at an output of each layer of neural network, wherein the maximum and minimum value at the output of each layer of neural network is also referred to as 'intermediate features'. For example, $X\_max_{iL}$ represents maximum value at the output of $L^{th}$ Layer of $i^{th}$ image in the reduced dataset, and $X\_min_{iL}$ represents minimum value at the output of $L^{th}$ Layer of $i^{th}$ image in the reduced dataset.

After computing the maximum and minimum value of each layer of all the true positive images, the dataset reduction module 124 is configured to compute the global maximum value of each layer as shown in eq. (1) and compute the global minimum value of each layer as shown in eq. (2)

$$X\_max_L = Max\{abs(X\_max_{iL})\} \quad (1)$$

$$X\_min_L = Max\{abs(X\_min_{iL})\} \quad (2)$$

In one embodiment, the effective vector of each image is computed by computing ratio of the global maximum value of all test images for each layer of the neural network and maximum value of a particular test image for each layer, and ratio of global minimum value of all test images for each layer of the neural network and minimum value of a particular test image for each layer, as shown in eq. (3).

$$\text{Effective vector}_i = \{(X\_max_L/X\_max_{iL}),(X\_max_L/X\_max_{iL})\} \quad (3)$$

Upon computing the effective vector for each test image, the dataset reduction module 124 is configured to apply k-means clustering and stratified sampling to the computed effective vector of each test image, to cluster the test images to k-clusters. In an exemplary embodiment, the value of k is chosen based on number of classes and total number of images.

Upon clustering and sampling the effective vector of each test image, the dataset reduction module 124 is configured to select one or more images from each cluster, to obtain the reduced dataset 114. In one embodiment, the dataset reduction module 124 selects outliers of each cluster or group as they are most sensitive true positive images that get affected by quantization. Therefore, the dataset reduction module 124 selects the one or more images from each cluster along with outliers, effective vector falling far away from the centre of the clusters. In one embodiment, in order to obtain M images as reduced dataset 114, the dataset reduction module 124 is configured to select M/k images from each cluster in the order of the increasing distance from centre of each of k clusters. On obtaining the reduced dataset 114, the system 100 proceeds to perform quantization on the reduced dataset 114.

In one embodiment, the shift constant determination module 126 is configured to receive the reduced dataset 114 from the dataset reduction module 124 and determine shift constant for each layer of the neural network based on the reduced dataset 114. In one embodiment, the shift constant determination module 126 is configured to determine the shift constant based on type of the layer of the neural network, wherein the type of layer includes one of a parametric layer and a non-parametric layer, wherein the non-parametric layer is one of activation layer, pooling layer, layer with multiple inputs and non-operational single input single output layers.

In order to determine the shift constant of the parametric layer, the shift constant determination module 126 is configured to determine one or more parameters associated with an input for each parametric layer. In one embodiment, the input includes input data and weight data for that parametric layer. In one embodiment, the one or more parameters can be an absolute maximum value of the input for each parametric layer ($X_{absMax}$) as shown in eq. (4) and a quantization parameter (Qm·n) for each parametric layer. The value 'm' indicates a number of integer bits of a fixed-point dataset and the value 'n' indicates a number of fractional bits of a fixed point dataset.

$$X\text{absMax} = \text{Max}(\text{Absolute}(X\text{max}),\text{Absolute}(X\text{min})) \quad (4)$$

wherein the input is uniformly distributed over (Xmin, Xmax).

The number of integer bits "m" is based on the value of XabsMax as shown in below eq. (5)

$$m = 0; \text{if } X\text{absMax} < 1$$

$$m = \text{ceil}(\log_2(X\text{absMax})); \text{otherwise} \quad (5)$$

The number of fractional bits "n" is computed as shown in below eq. (6)

$$n = M\text{bits} - m - 1 \quad (6)$$

wherein Mbits is a maximum number of bits present to represent the input distribution in fixed point.

After determining the one or more parameters, the shift constant determination module 126 is configured to compute an initial shift constant ($C_{sc\_init}$) using the determined parameter as shown in eq. (7).

$$C_{sc\_init} = (2^{m+n}-1)/(X_{absMax} * 2^n) \quad (7)$$

Upon determining the initial shift constant, the shift constant determination module 126 is configured to perform the quantization of parametric layer using the initial shift as shown in eq. (8) and (9).

$$X_{temp} = \text{Saturate}(-2^{Mbits}-1, \text{Roundnearest}(X_{fp} * C_{sc\_init} * 2^n), 2^{Mbits-1}-1) \quad (8)$$

Wherein $X_{fp}$ is the floating-point data from the reduced dataset, and Mbits is a maximum number of bits present to represent the floating-point data in fixed-point e.g., 8-bit/16-bit.

$$X_{quant} = X_{temp}/2^n \quad (9)$$

The shift constant determination module 126 is configured to estimate a first output value using the quantization shown in eq. (8) and (9) at an output of the neural network in response to the quantization.

The shift constant determination module 126 is configured to compute a model-interference-error (MIE) at the output of the neural network, after the quantization is performed. The MIE is computed by comparing the estimated first output value with a second output value, wherein the second output value is determined as an output of the neural network prior to quantization.

The shift constant determination module 126 is configured to determine an updated shift constant ($C_{sc\_updt}$) as shown in eq. (10).

$$C_{sc\_updt}(i+1) = C_{sc\_updt}(i) * 2^i \quad (10)$$

wherein $C_{sc\_updt}(i) = C_{sc\_init}$ for the $1^{st}$ iteration, wherein "i" is an iteration number, $C_{sc\_updt}(i)$ is a shift constant of $i^{th}$ iteration, and $C_{sc\_updt}(i+1)$ is a shift constant of $(i+1)^{th}$ iteration.

Figure 5:
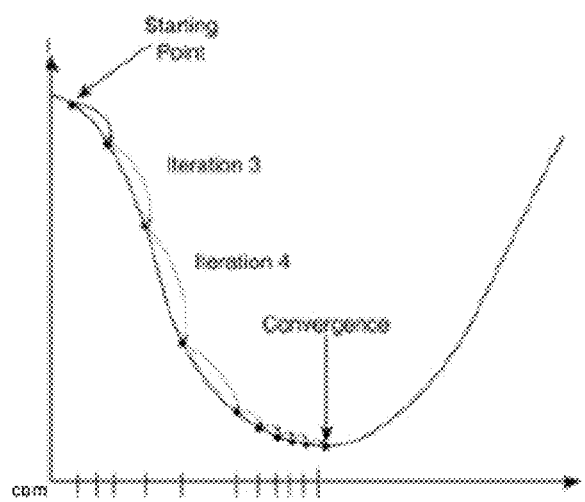
FIG. 5 illustrates an exemplary loss convergence pattern in model inference error, when determining shift constant for parametric layer of FIG. 4, in accordance with some embodiments of the present disclosure.

The shift constant determination module 126 is then configured to iterate the step of obtaining $C_{sc\_updt}$ and performing quantization till the MIE converges to a minimum value as shown in FIG. 5. A plot between the model inference error for each iteration with respect to the iteration number is shown in FIG. 5. From the FIG. 5, the shift constant corresponding to the iteration number at which MIE is minimum is taken as the shift constant.

Upon obtaining the shift constant at which the MIE converges, the shift constant determination module is configured to find an updated final shift constant by performing above procedure using the below eq. (11)

$$C_{sc\_updt}(i+1) = C_{sc\_updt}(i) * (2^{i-1} + j * 10^{-E}) \quad (11)$$

wherein $C_{sc\_updt}(1)$ is an updated shift constant obtained using the eq. (10) for which MLE converges to minimum error value, The shift constant determination module 126 is configured to determine shift constant for the non-parametric layer by assigning the shift constant as '1' when a first layer of the neural network is the non-parametric layer. For other non-parametric layers, the shift constant determination module 126 is configured to determine shift constant for the non-parametric layer having non-exponential input by assigning the shift constant of a previous layer, and determine shift constant for the non-parametric layer having exponential input by assigning the shift constant as '1'.

The shift constant determination module 126 is configured to determine shift constant for the layer with multiple inputs by assigning minimum of the shift constant of the previous layers, as the shift constant for the layer with multiple inputs. For example, when Add layer (i.e., layer with multiple inputs) is connected to conv1 and conv2 having sc1 and sc2 respectively, the shift constant determination module 126 determines the shift constant for Add layer as min(sc1, sc2).

The quantization module 128 is coupled to the shift constant determination module 126 and is configured to receive the shift constant value of each layer. The quantization module 128 performs quantization of input data associated with each layer using the below eq. (12) and (13), wherein the input data is input for each layer.

$$X_{temp} = \text{Saturate}(-2^{Mbits-1}, \text{Roundnearest}(X_{fp} * 2^n), 2^{Mbits-1} - 1) \quad (12)$$

Wherein $X_{fp}$ is the input data, $$X_{quant} = X_{temp}/2^n \quad (13)$$

The quantization module 128 performs quantization of weight data associated with the first layer using the below eq. (14) and (15).

$$X_{temp} = \text{Saturate}(-2^{Mbits-1}, \text{Roundnearest}(X_{fp} * C_{sc} * 2^n), 2^{Mbits-1} - 1) \quad (14)$$

Wherein $X_{fp}$ is the weight data, wherein $C_{sc}$ is shift constant of the first layer.

$$X_{quant} = X_{temp}/2^n \quad (15)$$

The quantization module 128 performs quantization of weight data associated with the layer other than first layer using the below eq. (16) and (17).

$$X_{temp} = \text{Saturate}(-2^{Mbits-1}, \text{Roundnearest}(X_{fp} * \{C_{sc}/C_{sc\_i}\} * 2^n), 2^{Mbits-1} - 1) \quad (16)$$

Here, by performing $C_{sc}/C_{sc\_i}$ there will be improvement in performance of the MLS 100 as the additional divisions required at each layer are eliminated by performing a single operation of $C_{sc}/C_{sc\_i}$.

Wherein $X_{fp}$ is the weight data, wherein $C_{sc}$ is shift constant of the present layer, and wherein $C_{sc\_i}$ is shift constant of previous parametric layer.

$$X_{quant} = X_{temp}/2^n \quad (17)$$

Figure 2:
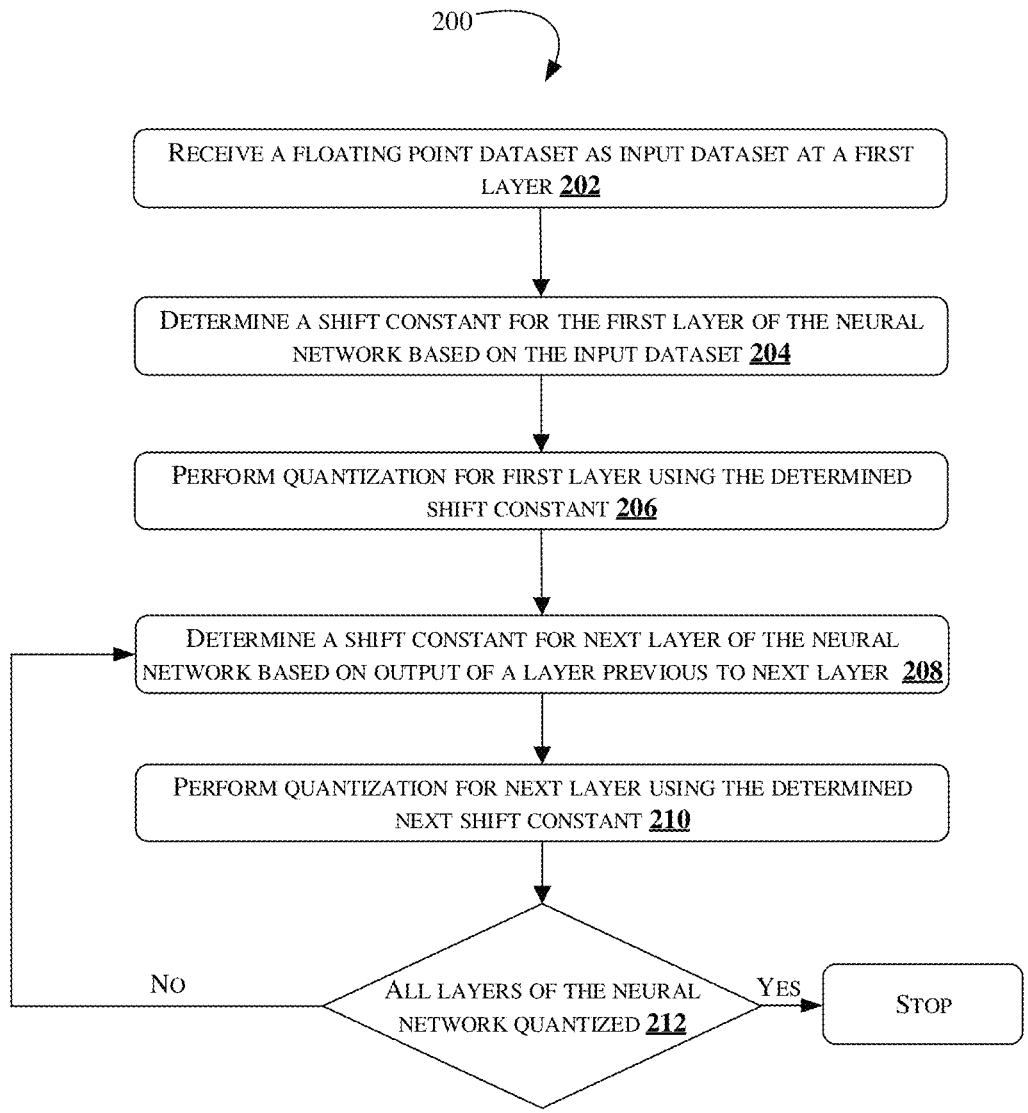
FIG. 2 shows a flowchart of an exemplary method of performing quantization of a neural network in accordance with some embodiments of the present disclosure.

FIG. 2 illustrates a flow chart of an exemplary method of performing quantization of a neural network in accordance with some embodiments of the present disclosure.

The method 200 comprises one or more blocks implemented by the MLS 100 for performing quantization of the neural network. The method 200 may be described in the general context of a computer processor executable instructions. Generally, computer processor executable instructions can include scalar instructions, vector instructions, comparison and selection-based instructions etc.

The order in which the method 200 is described in not intended to be construed as a limitation, and any number of the described method blocks can be combined in any order to implement the method 200. Additionally, individual blocks may be deleted from the method 300 without departing from the spirit and scope of the subject matter described herein. Furthermore, the method 200 can be implemented in any suitable hardware having parallel processing capability, software executed by a processor, firmware, or combination thereof.

At block 202, receive a reduced dataset as input dataset at a first layer from the dataset reduction module 124. In one embodiment, the shift constant determination module 126 is configured to receive the reduced dataset to perform quantization of the neural network. The method of obtaining reduced dataset from an original validation dataset will be explained in the forthcoming paragraphs with respect to FIG. 3.

At block 204, a shift constant for the first layer of the neural network is determined. In one embodiment, the shift constant determination module 126 is configured to determine shift constant for the first layer of the neural network. In one embodiment, the shift constant determination module 126 is configured to determine the shift constant based on type of the layer of the neural network, wherein the type of layer includes one of a parametric layer and a non-parametric layer, and wherein the non-parametric layer can be one of activation layer, pooling layer, and layer with multiple inputs.

In another embodiment, the shift constant determination module 126 is configured to determine shift constant for each parametric layer of the neural network will be explained in the forthcoming paragraphs with respect to FIG. 4.

In yet another embodiment, the shift constant determination module 126 is configured to determine shift constant for the non-parametric layer by assigning the shift constant as '1' when the first layer is the non-parametric layer. In another embodiment, if the first layer is a parametric layer, the shift constant determination module 126 determined the shift constant for the subsequent non-parametric layer having non-exponential input by assigning the shift constant of the previous layer as the shift constant for the activation layer, pooling layer, and non-operational single input single output layers.

In still further embodiment, the shift constant determination module 126 is configured to determine shift constant for the layer with multiple inputs by assigning minimum of the shift constant of the previous layers, as the shift constant for the layer with multiple inputs.

At block 206, quantization for the first layer using the determined shift constant is performed by the quantization module 128. The quantization module 128 performs quantization of input data associated with each layer using the below eq. (12) and (13). The quantization module 128 performs quantization of weight data associated with the first layer using the below eq. (14) and (15). The quantization module 128 performs quantization of weight data associated with the layer other than first layer using the below eq. (16) and (17).

At block 208, a shift constant for next layer of the neural network is determined. In one embodiment, the shift constant determination module 126 is configured to determine shift constant for the next layer of the neural network based on output of a layer previous to next layer using the similar steps performed in step 204.

At block 210, quantization for the next layer using the determined next shift constant is performed by the quantization module 128 using the similar steps performed in step 206.

At block 212, quantization of all layers of the neural network is determined. In one embodiment, the quantization module 128 determines as to whether all layers in the neural network are quantized. If it is determined that all the layers are quantized, the method stops further processing along the YES block. Otherwise, the method proceeds to block 208 along the NO block and the steps in blocks 208 and 210 are iterated till all the layers of the neural network are quantized, thereby obtaining a fixed point dataset as an output of the neural network.

Figure 3:
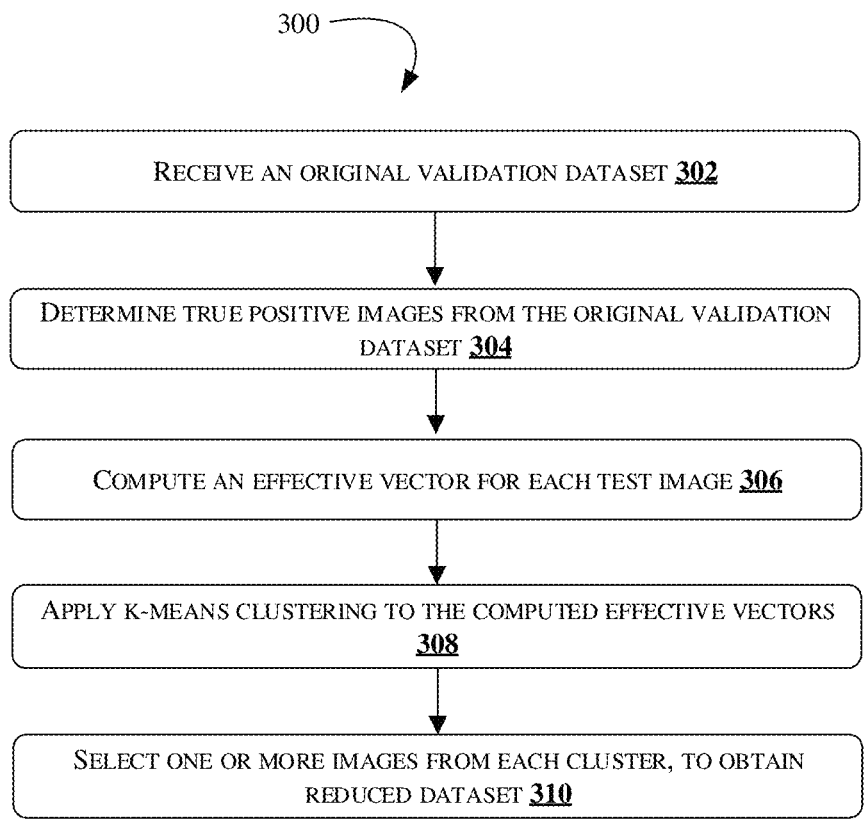
FIG. 3 shows a flowchart of an exemplary method for obtaining reduced dataset from an original validation dataset in accordance with some embodiments of the present disclosure.

FIG. 3 illustrates a flow chart of an exemplary method for obtaining reduced dataset from an original validation dataset in accordance with some embodiments of the present disclosure.

The method 300 comprises one or more blocks implemented by the dataset reduction module 124 for obtaining reduced dataset. The method 300 may be described in the general context of a computer processor executable instructions. Generally, computer processor executable instructions can include scalar instructions, vector instructions, comparison and selection-based instructions etc.

The order in which the method 300 is described in not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware having parallel processing capability, software executed by a processor, firmware, or combination thereof.

At block 302, receive an original validation dataset 112 from the receiving module 122. In one embodiment, the original validation dataset 112 comprises a plurality of test images.

At block 304, true positive images from the original validation dataset 112 are determined. The dataset reduction module 124 is configured to determine true positive images from the received original validation dataset 112 if the original validation dataset 112 comprises true positive and false positive images as classified by respective models. The dataset reduction module 124 retrieves true positive images as test images from the original validation dataset 112 for computing effective vector, as false positive images will not degrade the accuracy after quantization.

At block 306, an effective vector for each test image is computed. The dataset reduction module 124 is configured to compute an effective vector for each test image. In order to compute the effective vector of each test image, the dataset reduction module 124 is configured to compute maximum and minimum value at an output of each layer of neural network. For example, $X\_max_{iL}$ represents maximum value at the output of $L^{th}$ Layer of $i^{th}$ image, and $X\_min_{iL}$ represents minimum value at the output of $L^{th}$ Layer of $i^{th}$ image.

After computing the maximum and minimum value of each layer of all the test images, the dataset reduction module 124 is configured to compute the global maximum value of each layer as shown in eq. (1) and compute the global minimum value of each layer as shown in eq. (2).

In one embodiment, the effective vector of each image is computed by computing ratio of maximum value of all test images for each layer of the neural network and maximum value of a particular test image for each layer, and ratio of minimum value of all test images for each layer of the neural network and minimum value of a particular test image for each layer, as shown in eq. (3).

At block 308, k-means clustering and stratified sampling to the computed effective vector is applied, upon computing the effective vector for each test image. The dataset reduction module 124 is configured to apply k-means clustering and stratified sampling to the computed effective vector of each test image, to cluster the test to k-clusters. In an exemplary embodiment, the value of k is chosen based on number of classes and total number of images.

At block 310, one or more images from each cluster is selected to obtain the reduced dataset, upon clustering and sampling the effective vector of each true positive image. The dataset reduction module 124 is configured to select one or more images from each cluster, to obtain the reduced dataset 114. In one embodiment, in order to M images of reduced dataset, the dataset reduction module 124 is configured to select M/k images from each cluster, in the order of the increasing distance from centre of each of k clusters.

Figure 4:
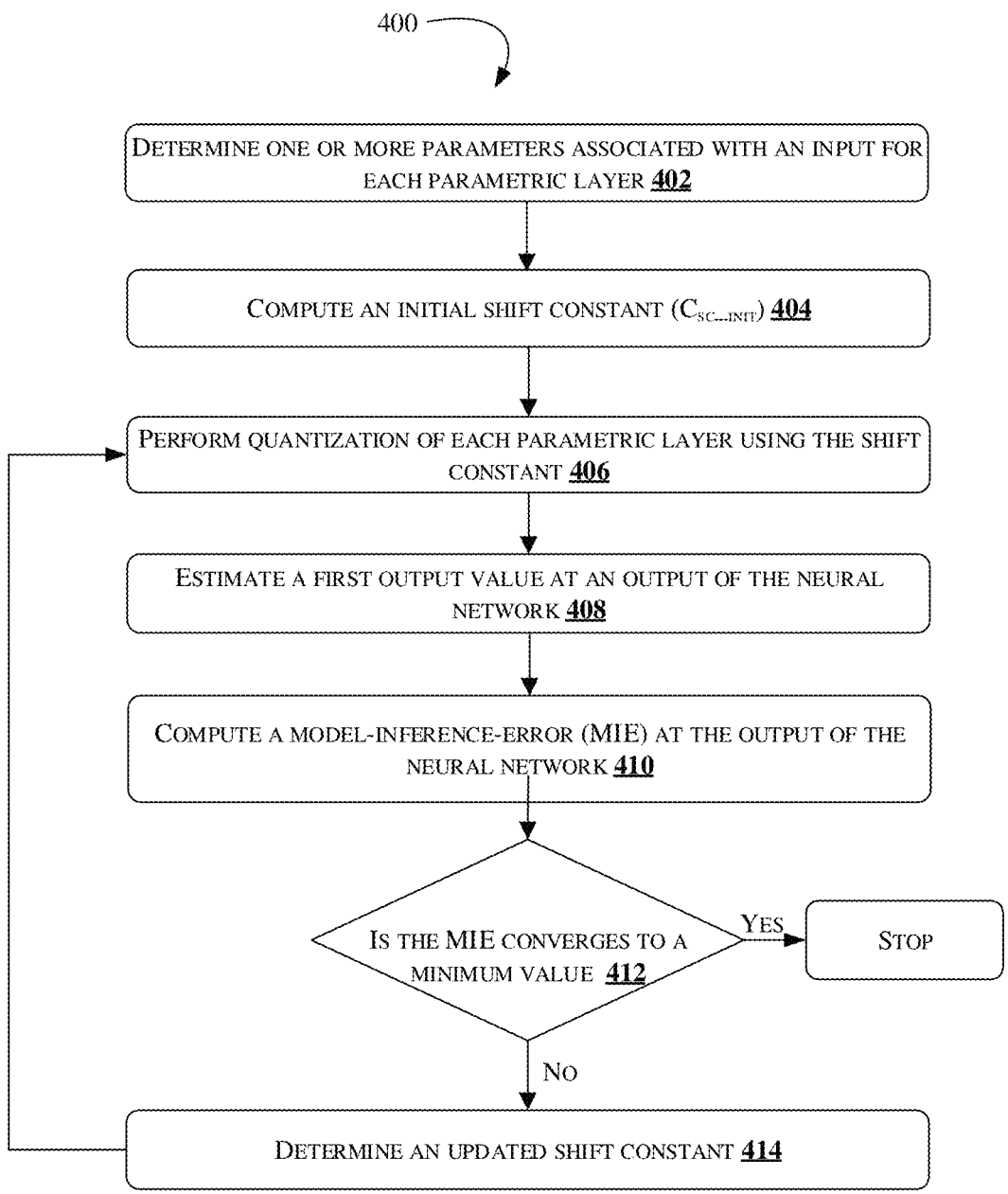
FIG. 4 shows a flowchart for an exemplary method for determining a shift constant for parametric layer, in accordance with some embodiments of the present disclosure.

FIG. 4 illustrates a flow chart of an exemplary method for determining a shift constant for parametric layer, in accordance with some embodiments of the present disclosure.

The method 400 comprises one or more blocks implemented by the shift constant determination module 126 to determine a shift constant for the parametric layer. The method 400 may be described in the general context of a computer processor executable instructions. Generally, computer processor executable instructions can include scalar instructions, vector instructions, comparison and selection-based instructions etc.

The order in which the method 400 is described in not intended to be construed as a limitation, and any number of the described method blocks can be combined in any order to implement the method 400. Additionally, individual blocks may be deleted from the method 400 without departing from the spirit and scope of the subject matter described herein. Furthermore, the method 400 can be implemented in any suitable hardware having parallel processing capability, software executed by a processor, firmware, or combination thereof.

At block 402, one or more parameters associated with an input for each parametric layer is determined. In one embodiment, the shift constant determination module 126 is configured to determine one or more parameters associated with an input for each parametric layer. In one embodiment, the input includes input data and weight data for that parametric layer. In one embodiment, the one or more parameters can be an absolute maximum value of the input for each parametric layer ($X_{absMax}$) as shown in eq. (4) and a quantization parameter (Qm·n) for each parametric layer. The value 'm' indicates a number of integer bits of a fixed-point dataset and the value 'n' indicates a number of fractional bits of a fixed point dataset.

At block 404, an initial shift constant is computed using the determined parameters. In one embodiment, the shift constant determination module 126 is configured to compute an initial shift constant ($C_{sc\_init}$) using the determined parameter as shown in eq. (7).

At block 406, quantization of each parametric layer is performed using the shift constant. In one embodiment, the shift constant determination module 126 is configured to perform the quantization using the initial shift as shown in eq. (8) and (9).

At block 408, a first output value at an output of the neural network is estimated. In one embodiment, the shift constant determination module 126 is configured to estimate a first output value at an output of the neural network in response to the quantization.

At block 410, a model-inference-error (MIE) at the output of the neural network is computed based on the first output value and a second output value. In one embodiment, the shift constant determination module 126 is configured to compute a model-interference-error (MIE) at the output of the neural network, after the quantization is performed by comparing the estimated first output value with a second output value, wherein the second output value is determined as an output of the neural network prior to quantization.

At block 412, whether the MIE converges to a minimum error value is determined. In one embodiment, if the shift constant determination module 126 determines that the MIE converges to a minimum value, then the method stops further processing along the YES block. Otherwise, the method proceeds to block 414 along the NO block to determine an updated shift constant. At block 414, an updated shift constant is determined if the MIE does not converge to the minimum value. In one embodiment, the shift constant determination module 126 is configured to determine an updated shift constant ($C_{sc\_updt}$) as shown in eq. (10).

Figure 6:
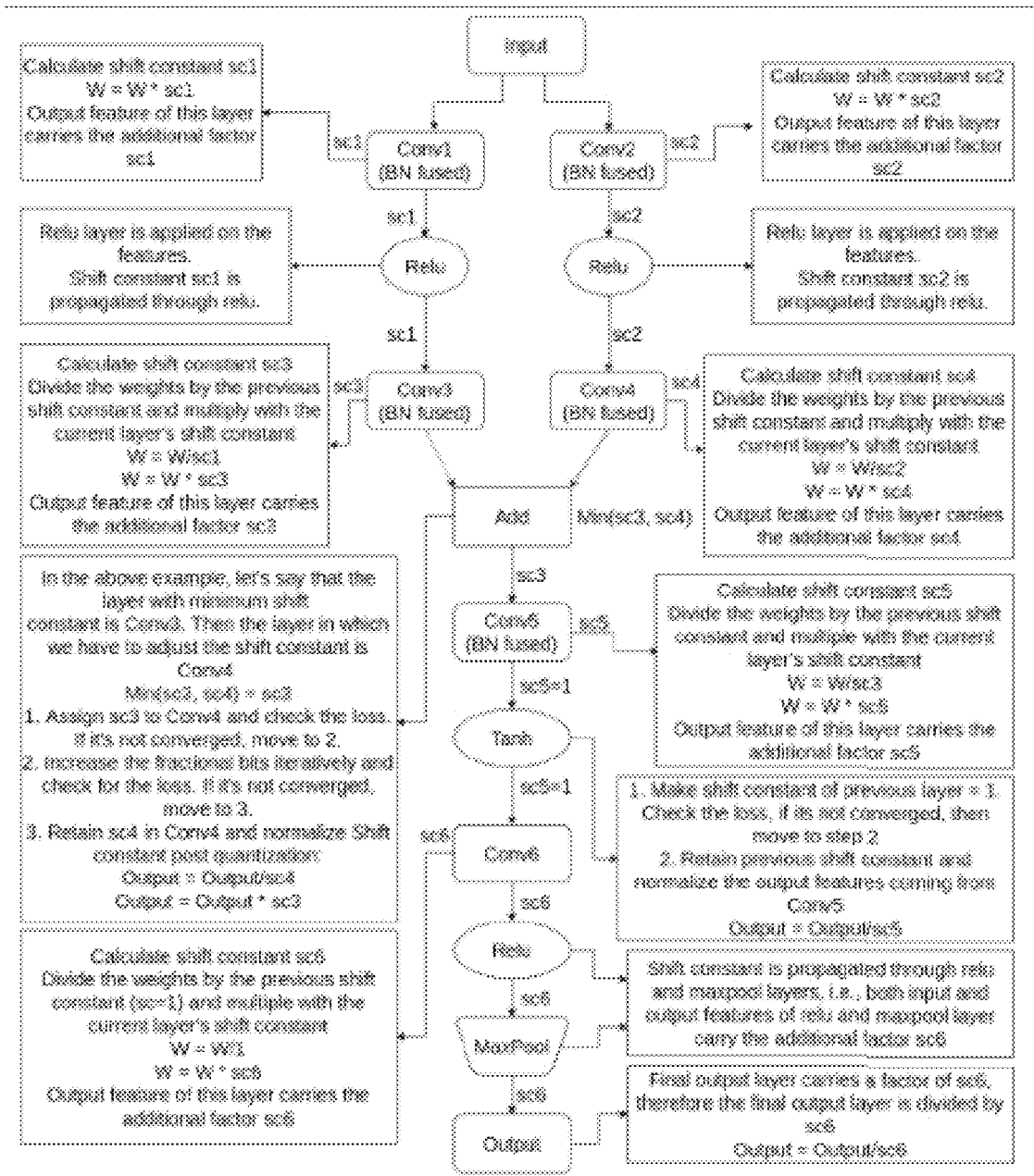
FIG. 6 illustrates an exemplary arrangement of different layers in neural network to perform quantization, in accordance with some embodiments of the present disclosure.

FIG. 6 illustrates an exemplary arrangement of different layers in neural network to perform quantization, in accordance with some embodiments of the present disclosure.

As shown in FIG. 6, the neural network comprises multiple layers such as conv1, conv2, relu, conv3, conv4, Add, Tan h, conv6, relu, maxpool layers.

In order to perform quantization, shift constant for each layer needs to be determined.

The initial input dataset is passed through the conv1 and conv2 layer. By performing the step 204 for the conv1 and conv2, a shift constant of sc1 and sc2 are obtained, respectively. Further, by performing the step 206, the conv1 and conv2 layers are quantized using the shift constant sc1 and sc2, respectively.

The output of the conv1 layer is passed as input to the relu layer and shift constant for the relu layer is determined as shift constant of previous layer i.e., sc1. Similar, shift constant of another relu layer connected to the conv2 is determined as shift constant of previous layer i.e., sc2.

For the conv3 layer, the shift constant is determined as sc3 and perform quantization using the shift constant sc3 and previous parametric layer shift constant sc1 i.e., sc3/sc1.

For the conv4 layer, the shift constant is determined as sc4 and perform quantization using the shift constant sc4 and previous parametric layer shift constant sc2 i.e., sc4/sc1.

For the Add layer connected to conv3 and conv4, the shift constant is determined as minimum of sc3 and sc4 i.e., sc3 as shown in FIG. 6.

For the conv5 layer connected to Add layer, the shift constant is determined as sc5 and perform quantization using the shift constant sc5 and previous parametric layer shift constant sc3 i.e., sc5/sc3.

For the Tan h layer connected to Add layer, the shift constant is determined as 1 as the layer is exponential layer.

For the conv6 layer connected to Tan h layer, the shift constant is determined as sc6 and perform quantization using the shift constant sc6 and previous layer shift constant 1. The similar procedure is repeated for all layers as shown in FIG. 6.

The apparatus and method disclosed herein present an improved way of quantizing the neural network. The method presents improved way of computing an effective shift constant for each neural network that minimize model interference error, thereby making the quantized neural networks deployed even in resource constrained settings.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

We claim:
1. A method of performing quantization of an artificial neural network having multiple layers, comprising:
 a) receiving a floating-point dataset as input dataset at a first layer of the neural network;
 b) determining a first shift constant for the first layer of the neural network based on the input dataset;
 c) performing quantization for the first layer using the determined shift constant of the first layer;
 d) determining a next shift constant for next layer of the neural network based on output of a layer previous to the next layer;
 e) performing quantization for the next layer using the determined next shift constant; and
 f) iterating the steps d) and e) for all layers of the neural network, to generate a fixed point dataset as output dataset;
  wherein determining the shift constant for each layer comprises determining the shift constant based on type of the layer of the neural network, wherein the type of layer includes one of a parametric layer and a non-parametric layer, and wherein the non-parametric layer include one of activation layer, pooling layer, layer with multiple inputs and non-operational single input single output layers.

2. The method of claim 1, wherein determining the shift constant for the parametric layer comprises:
 a) determining one or more parameters associated with an input for each parametric layer, wherein the input includes input data and weight data for each parametric layer;
 b) computing an initial shift constant ($C_{sc\_init}$) using the determined parameters;
 c) performing the quantization of each parametric layer using the initial shift constant, wherein the quantization converts floating point weights associated with each parametric layer to corresponding fixed point weights associated with each parametric layer;
 d) estimating a first output value at an output of the neural network in response to the quantization;
 e) computing a model-inference-error at the output of the neural network, after the quantization is performed by comparing the estimated first output value with a second output value, wherein the second output value is determined as an output of the neural network prior to quantization;
 f) determining an updated shift constant based on the shift constant of previous iteration multiplied with $2^i$, wherein 'i' indicates an iteration number; and
 g) iterating the steps c) to f) with the updated shift constant till the computed model-inference-error converges to a minimum error value.

3. The method of claim 2, wherein in response to determining the updated shift constant for the parametric layer, the method further comprises:
 a) receiving the updated shift constant as an initial shift constant;
 b) determining an updated final shift constant based on the shift constant of previous iteration multiplied with ($2^{i-1}+j*10^{-E}$), wherein 'j' ranges from $2^{i-1}$ to $2^{i+1}$, and wherein E ranges from 0 to 2, so that the updated final shift constant ranges upto two decimal precision;
 c) performing the quantization of each parametric layer using the updated final shift constant;
 d) computing a third output value at the output of the neural network in response to the quantization;
 e) computing a final model-inference-error at the output of the neural network, after the quantization is performed by comparing the computed third output value with the second output value; and
 f) iterating the steps b) to e) with the updated final shift constant by varying the parameters 'j' and 'E' till the computed final model-inference-error converges to another minimum error value, wherein shift constant corresponding to another minimum error value is determined as the updated final shift constant.

4. The method of claim 2, wherein determining the one or more parameters associated with the input of each parametric layer comprises determining an absolute maximum value of the input for each parametric layer (XabsMax) and a quantization parameter (Qm·n) from the input for the particular parametric layer, wherein 'm' indicates a number of integer bits of a fixed point dataset, and 'n' indicates a number of fractional bits of the fixed point dataset.

5. The method of claim 1, wherein if the first layer of the neural network is the parametric layer,
 determining the shift constant for the subsequent non-parametric layer having a non-exponential input comprises assigning a shift constant of the previous layer as the shift constant for the activation layer, pooling layer, and non-operational single input single output layers;
 determining the shift constant for the subsequent non-parametric layer having an exponential input comprises assigning a shift constant as '1'; and
 determining the shift constant for the subsequent layer with multiple inputs comprises assigning minimum of the shift constant of the previous layers as the shift constant for the layer with multiple inputs.

6. The method of claim 1, wherein if the first layer of the neural network is the non-parametric layer, determining the shift constant for the non-parametric layer comprises assigning the shift constant as '1'.

7. The method of claim 2, wherein performing quantization for each layer comprises:
 performing quantization for at least one of:
  the input data of a particular layer using the determined one or more parameters, and
  the weight data of the particular layer using at least one of the determined shift constant and a shift constant of a previous parametric layer.

8. The method of claim 1, wherein the floating point dataset is a reduced dataset, wherein the reduced dataset is obtained by steps comprising:
 receiving an original validation dataset as input dataset, wherein the original validation dataset includes a plurality of test images;
 computing an effective vector for each of the plurality of test images, wherein the effective vector is computed from at least one of ratio of maximum value of all test images for each layer of the neural network and maximum value of a particular test image for each layer, and ratio of minimum value of all test images for each layer of the neural network and minimum value of a particular test image for each layer;
 applying k-means clustering and stratified sampling to the computed effective vector of each test images; and
 selecting one or more images from each cluster, to obtain the reduced dataset.

9. A system to perform quantization of a neural network having multiple layers, the apparatus comprises:
 a processor configured to:
 a) receive a floating-point dataset as input dataset at a first layer of the neural network;

b) determine a first shift constant for the first layer of the neural network based on the input dataset;

c) perform quantization for the first layer using the determined shift constant of the first layer;

d) determine a next shift constant for next layer of the neural network based on output of a layer previous to the next layer;

e) perform quantization for the next layer using the determined next shift constant; and f) iterate the steps b) and c) for all layers of the neural network, to generate a fixed point dataset as output dataset;

wherein the processor is configured to determine the shift constant based on type of the layer of the neural network, wherein the type of layer includes one of a parametric layer and a non-parametric layer, and wherein the non-parametric layer include one of activation layer, pooling layer, layer with multiple inputs, and non-operational single input single output layers.

10. The system of claim 9, wherein to determine the shift constant for the parametric layer, the processor is configured to:

a) determine one or more parameters associated with an input for each parametric layer, wherein the input includes input data and weight data for each parametric layer;

b) compute an initial shift constant ($C_{sc\_init}$) using the determined parameters;

c) perform the quantization of each parametric layer using the initial shift constant, wherein the quantization converts floating point weights associated with each parametric layer to corresponding fixed point weights associated with each parametric layer;

d) estimate a first output value at an output of the neural network in response to the quantization;

e) compute a model-inference-error at the output of the neural network, after the quantization is performed by comparing the estimated first output value with a second output value, wherein the second output value is determined as an output of the neural network prior to quantization;

f) determine an updated shift constant based on the shift constant of previous iteration multiplied with $2^i$, wherein 'i' indicates an iteration number; and g iterate the steps c) to f) with the updated shift constant till the computed model-inference-error converges to a minimum error value.

11. The system of claim 10, wherein in response to determination of the updated shift constant for the parametric layer, the processor is further configured to:

a) receive the updated shift constant as an initial shift constant;

b) determine an updated final shift constant based on the shift constant of previous iteration multiplied with ($2^{i-1}+j*10^{-E}$), wherein 'j' ranges from $2^{i-1}$ to $2^{i+1}$, and wherein E ranges from 0 to 2, so that the updated final shift constant ranges upto two decimal precision;

c) perform the quantization of each parametric layer using the updated final shift constant;

d) compute a third output value at the output of the neural network in response to the quantization;

e) compute a final model-inference-error at the output of the neural network, after the quantization is performed by comparing the computed third output value with the second output value; and f) iterate the steps b) to e) with the updated final shift constant by varying the parameters 'j' and 'E' till the computed final model-inference-error converges to another minimum error value, wherein shift constant corresponding to another minimum error value is determined as the updated final shift constant.

12. The system of claim 10, wherein to determine the one or more parameters associated with the input of each parametric layer, the processor is configured to:

determine an absolute maximum value of the input for each parametric layer ($X_{absMax}$) and a quantization parameter (Qm·n) from the input for each parametric layer, wherein 'm' indicates a number of integer bits of the fixed point dataset, and 'n' indicates a number of fractional bits of the fixed point dataset.

13. The system of claim 9, wherein if the first layer is the parametric layer, the processor is configured to:

determine the shift constant for the subsequent non-parametric layer having a non-exponential input by assigning a shift constant of the previous layer as the shift constant for the activation layer, pooling layer, and non-operational single input single output layers;

determine the shift constant for the subsequent non-parametric layer having an exponential input by assigning a shift constant as '1'; and determine the shift constant for the subsequent layer with multiple inputs by assigning minimum of the shift constant of the previous layers as the shift constant for the layer with multiple inputs.

14. The system of claim 9, wherein if the first layer of the neural network is the non-parametric layer, the processor is configured to determine the shift constant for the non-parametric layer by assigning a shift constant as '1'.

15. The system of claim 10, wherein to perform quantization for each layer, the processor is configured to:

perform quantization for at least one of:

the input data of a particular layer using the determined one or more parameters, and the weight data of the particular layer using at least one of the determined shift constant and a shift constant of a previous parametric layer.

16. The system of claim 9, wherein the floating point dataset is a reduced dataset, wherein the processor is configured to obtain the reduced dataset by steps comprising:

receiving an original validation dataset as input dataset, wherein the original validation dataset includes a plurality of test images;

computing an effective vector for each of the plurality of test images, wherein the effective vector is computed from at least one of ratio of maximum value of all test images for each layer of the neural network and maximum value of a particular test image for each layer, and ratio of minimum value of all test images for each layer of the neural network and minimum value of a particular test image for each layer;

applying k-means clustering and stratified sampling to the computed effective vector of each test images; and selecting one or more images from each cluster, to obtain the reduced dataset.

17. A non-transitory computer readable medium comprising instructions that, when executed, cause one or more processors to:

a) receive a floating-point dataset as input dataset at a first layer of the neural network;

b) determine a first shift constant for the first layer of the neural network based on the input dataset;

c) perform quantization for the first layer using the determined shift constant of the first layer;

d) determine a next shift constant for next layer of the neural network based on output of a layer previous to the next layer;

e) perform quantization for the next layer using the determined next shift constant; and f) iterate the steps b) and c) for all layers of the neural network, to generate a fixed point dataset as output dataset;

wherein the one or more processors is configured to determine the shift constant based on type of the layer of the neural network, wherein the type of layer includes one of a parametric layer and a non-parametric layer, and wherein the non-parametric layer include one of activation layer, pooling layer, layer with multiple inputs, and non-operational single input single output layers.

18. The non-transitory computer readable medium of claim 17, wherein to determine the shift constant for the parametric layer, the one or more processors is configured to:

a) determine one or more parameters associated with an input for each parametric layer, wherein the input includes input data and weight data for each parametric layer;

b) compute an initial shift constant ($C_{sc\_init}$) using the determined parameters;

c) perform the quantization of each parametric layer using the initial shift constant, wherein the quantization converts floating point weights associated with each parametric layer to corresponding fixed point weights associated with each parametric layer;

d) estimate a first output value at an output of the neural network in response to the quantization;

e) compute a model-inference-error at the output of the neural network, after the quantization is performed by comparing the estimated first output value with a second output value, wherein the second output value is determined as an output of the neural network prior to quantization;

f) determine an updated shift constant based on the shift constant of previous iteration multiplied with $2^i$, wherein 'i' indicates an iteration number; and g) iterate the steps c) to f) with the updated shift constant till the computed model-inference-error converges to a minimum error value.

19. The non-transitory computer readable medium of claim 18, wherein in response to determination of the updated shift constant for the parametric layer, the one or more processors is further configured to:

a) receive the updated shift constant as an initial shift constant;

b) determine an updated final shift constant based on the shift constant of previous iteration multiplied with ($2^{i-1}+j*10^{-E}$), wherein 'j' ranges from $2^{i-1}$ to $2^{i+1}$, and wherein E ranges from 0 to 2, so that the updated final shift constant ranges upto two decimal precision;

c) perform the quantization of each parametric layer using the updated final shift constant;

d) compute a third output value at the output of the neural network in response to the quantization;

e) compute a final model-inference-error at the output of the neural network, after the quantization is performed by comparing the computed third output value with the second output value; and f) iterate the steps b) to e) with the updated final shift constant by varying the parameters 'j' and 'E' till the computed final model-inference-error converges to another minimum error value, wherein shift constant corresponding to another minimum error value is determined as the updated final shift constant.

20. The non-transitory computer readable medium of claim 18, wherein to determine the one or more parameters associated with the input of each parametric layer, the processor is configured to:

determine an absolute maximum value of the input for each parametric layer ($X_{absMax}$) and a quantization parameter (Qm·n) from the input for each parametric layer, wherein 'm' indicates a number of integer bits of the fixed point dataset, and 'n' indicates a number of fractional bits of the fixed point dataset.

21. The non-transitory computer readable medium of claim 17, wherein if the first layer is the parametric layer, the processor is configured to:

determine the shift constant for the subsequent non-parametric layer having a non-exponential input by assigning a shift constant of the previous layer as the shift constant for the activation layer, pooling layer, and non-operational single input single output layers;

determine the shift constant for the subsequent non-parametric layer having an exponential input by assigning a shift constant as '1'; and determine the shift constant for the subsequent layer with multiple inputs by assigning minimum of the shift constant of the previous layers as the shift constant for the layer with multiple inputs.

22. The non-transitory computer readable medium of claim 17, wherein if the first layer of the neural network is the non-parametric layer, the processor is configured to determine the shift constant for the non-parametric layer by assigning a shift constant as '1'.

23. The non-transitory computer readable medium of claim 18, wherein to perform quantization for each layer, the processor is configured to:

perform quantization for at least one of:
the input data of a particular layer using the determined one or more parameters, and
the weight data of the particular layer using at least one of the determined shift constant and a shift constant of a previous parametric layer.

24. The non-transitory computer readable medium of claim 17, wherein the floating point dataset is a reduced dataset, wherein the processor is configured to obtain the reduced dataset by steps comprising:

receiving an original validation dataset as input dataset, wherein the original validation dataset includes a plurality of test images;

computing an effective vector for each of the plurality of test images, wherein the effective vector is computed from at least one of ratio of maximum value of all test images for each layer of the neural network and maximum value of a particular test image for each layer, and ratio of minimum value of all test images for each layer of the neural network and minimum value of a particular test image for each layer;

applying k-means clustering and stratified sampling to the computed effective vector of each test images; and selecting one or more images from each cluster, to obtain the reduced dataset.

\* \* \* \* \*